(12) United States Patent
Xu

(10) Patent No.: US 10,214,801 B2
(45) Date of Patent: Feb. 26, 2019

(54) NANOPARTICLE-REINFORCED COMPOSITES AND METHODS OF MANUFACTURE AND USE

(71) Applicant: Florida State University Research Foundation, Inc., Tallahassee, FL (US)

(72) Inventor: Chengying Xu, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 309 days.

(21) Appl. No.: 15/166,982

(22) Filed: May 27, 2016

(65) Prior Publication Data

US 2017/0058407 A1 Mar. 2, 2017

Related U.S. Application Data

(60) Provisional application No. 62/168,220, filed on May 29, 2015.

(51) Int. Cl.
| | | |
|---|---|---|
| *C23C 24/08* | (2006.01) | |
| *C22F 1/04* | (2006.01) | |
| *B23K 20/04* | (2006.01) | |
| *C22F 1/18* | (2006.01) | |
| *C22F 1/06* | (2006.01) | |

(Continued)

(52) U.S. Cl.
CPC ............. *C22F 1/04* (2013.01); *B23K 20/04* (2013.01); *B23K 20/233* (2013.01); *B23K 20/2333* (2013.01); *B32B 15/00* (2013.01); *C22F 1/06* (2013.01); *C22F 1/183* (2013.01); *C23C 24/06* (2013.01); *C23C 28/321* (2013.01); *C23C 28/341* (2013.01); *C23C 28/345* (2013.01); *B23K 2103/10* (2018.08); *B23K 2103/14* (2018.08); *B23K 2103/15* (2018.08); *B23K 2103/18* (2018.08); *B23K 2103/52* (2018.08);

(Continued)

(58) Field of Classification Search
CPC . C23C 24/082; B32B 15/00; B32B 2264/107; B32B 2264/102; C22F 1/04; C22F 1/183; C22F 1/06; B23K 20/04
See application file for complete search history.

(56) References Cited

U.S. PATENT DOCUMENTS

| | | | |
|---|---|---|---|
| 3,078,191 A | 2/1963 | Maeda | |
| 2002/0137872 A1* | 9/2002 | Schneider | ............ C09D 133/04 528/44 |
| 2009/0202812 A1* | 8/2009 | Schaeffler | ............. B22F 3/1125 428/312.2 |

OTHER PUBLICATIONS

Liu et al., "Cutting Force Prediction on Micromilling Magnesium Metal Matrix Composites With Nanoreinforcements," Journal of Micro and Nano-Manufacturing, vol. 1 (Mar. 2013) pp. 011010-1-011010-10.

(Continued)

*Primary Examiner* — Ryan J. Walters
(74) *Attorney, Agent, or Firm* — Eversheds Sutherland (US) LLP

(57) ABSTRACT

Composite structures and methods of their manufacture are provided. In one embodiment, the composite structure includes a substrate which includes a relatively soft material, and nanoparticles which include a relatively hard material and which are embedded (i) within at least a surface region of the substrate, or (ii) uniformly within and throughout the substrate, in an amount effective to improve the wear resistance of the substrate. Methods for forming these composite structures include a hot-rolling process, a roll-bonding process, or a combination thereof.

7 Claims, 5 Drawing Sheets

(51) Int. Cl.
  *B32B 15/00* (2006.01)
  *B23K 20/233* (2006.01)
  *C23C 24/06* (2006.01)
  *C23C 28/00* (2006.01)
  *B23K 103/10* (2006.01)
  *B23K 103/14* (2006.01)
  *B23K 103/08* (2006.01)
  *B23K 103/18* (2006.01)
  *B23K 103/00* (2006.01)

(52) U.S. Cl.
  CPC ... *B32B 2264/102* (2013.01); *B32B 2264/107* (2013.01)

(56) References Cited

OTHER PUBLICATIONS

Yang et al., "Fabrication of AA6061/Al2O3 nano ceramic particle reinforced composite coating by using friction stir processing," J. Mater Sci., vol. 45 (Apr. 2010) pp. 4431-4438.

An et al., "Aluminum nanocomposites having wear resistance better than stainless steel," J. Mater. Res., vol. 26, No. 19, (Oct. 2011) pp. 2479-2483.

Alizadeh et al., "Fabrication of Al/SiCp composite strips by repeated roll-bonding (RRB) process," Journal of Alloys and Compounds, vol. 477 (2009) pp. 811-816.

Kevorkijan, "Functionally Graded Aluminum-Matrix Composites," American Ceramic Society Bulletin, vol. 82, No. 2, (Feb. 2003) pp. 60-64.

Munro, R.G., "Material Properties of a Sintered α-SiC," J. Phys. Chem. Ref. Data, vol. 26, No. 5, (1997) pp. 1195-1203.

Sumomogi et al., "Nanoscale Mechanical Properties of Ultrahigh-Purity Aluminum," Materials Transactions, vol. 46, No. 9 (2005) pp. 1996-2002.

Deuis et al., "Dry Sliding Wear of Aluminum Composites—A Review," Composites Science and Technology, vol. 57 (1997) pp. 415-435.

Prabhu et al., "Synthesis and characterization of high volume fraction Al—Al2O3 nanocomposite powders by high-energy milling," Materials Science & Engineering A 425 (2006) pp. 192-200.

Campbell et al., "Dynamics of Oxidation of Aluminum Nanoclusters using Variable Charge Molecular-Dynamics Simulations on Parallel Computers," Physical Review Letters, vol. 82, No. 4 (1999) pp. 4866-4869.

Cho et al., "Surface properties and tensile bond strength of HVOF thermal spray coatings of WC—Co powder onto the surface of 420J2 steel and the bond coats of Ni, NiCr, and Ni/NiCr," Surface and Coatings Technology, vol. 203 (2009), pp. 3250-3253.

Kim et al., "Wear performance of metamorphic alloy coatings," Wear, vol. 232 (1999) pp. 51-60.

Shafiei-Zarghani et al., "Microstructures and mechanical properties of Al/Al2O3 surface nano-composite layer produced by friction stir processing," Materials Science and Engineering A, 500 (2009) pp. 84-91.

Hunt, Jr. et al., "Aluminum Metal Matrix Composites," Advanced Materials & Processes, (Feb. 2004) pp. 39-42.

Becker, "Aluminum: New Challenges in Downstream Activities," JOM 51 (1999) pp. 26-38.

* cited by examiner

NANOPARTICLE-REINFORCED COMPOSITES AND METHODS OF MANUFACTURE AND USE

CROSS-REFERENCE TO RELATED APPLICATION

This application claims priority to U.S. Provisional Patent Application No. 62/168,220, filed May 29, 2015, which is incorporated herein by reference.

BACKGROUND

In structural applications where surface contact is involved (e.g., submarine mast fairing guiderails and carrier landing cable-guiding sheaves), the performance and useful life of suitable materials are chiefly determined by their surface properties such as wear resistance and hardness. Aluminum-based materials are attractive for these types of structural applications in the aerospace, military, and transportation industries due to their light weight, high strength-to-weight ratio, and good corrosion resistance. However, the applications for aluminum-based materials are significantly limited, due to their poor surface properties, e.g., poor wear resistance, evidenced as severe adhesive wear. Other materials, such as magnesium and titanium, also suffer from poor wear resistance, and therefore, applications with these materials are similarly limited.

Although $Al_2O_3$—Al composites containing a relatively high concentration (15 volume percent) of $Al_2O_3$ nanoparticles have been found to exhibit superior wear resistance by showing both significantly lower wear rates and desired abrasive wear, direct usage of these bulk nanocomposites is limited because of the resulting reduction in ductility and thermal conductivity. In addition, the bulk process (mechanical alloying+hot isostatic pressing) typically used to manufacture these $Al_2O_3$—Al composites is time- and energy-intensive, and has stringent part size and geometry restrictions.

It therefore would be desirable to provide new and improved nanoparticle-reinforced composites that provide a hard, strong, wear-resistant surface, while still maintaining the ductility and thermal conductivity of the substrate material that, by itself, otherwise has poor surface properties. It would also be desirable to provide new and improved methods for making these composites.

SUMMARY

In one aspect, methods are provided for forming a composite structure that includes nanoparticle reinforcement of a substrate material.

In one embodiment, the method includes heating a metal substrate material to a selected temperature to form a heated metal substrate; disposing a plurality of ceramic nanoparticles onto a surface of the heated metal substrate; and applying a roller across the surface of the heated metal substrate under a pressure effective to embed the ceramic nanoparticles within a surface region of the heated metal substrate.

In another embodiment, the method includes providing a starting structure that includes a stack of two or more layers of a metal substrate material with a first plurality of ceramic nanoparticles dispersed between adjacent layers of the metal substrate material; compressing the starting structure between rollers to embed the first plurality of ceramic nanoparticles within the layers of the metal substrate material and to bond the layers of the metal substrate material together, forming a first compressed structure; and further processing the first compressed structure to form a composite structure in which the ceramic nanoparticles are substantially uniformly dispersed within the metal substrate material.

In yet another embodiment, the method includes providing a starting structure that includes a stack of two or more layers of a metal substrate material with a plurality of ceramic nanoparticles dispersed between adjacent layers of the metal substrate material; and compressing the starting structure between rollers to embed the plurality of ceramic nanoparticles within the layers of the metal substrate material and to bond the layers of the metal substrate material together, forming a compressed structure in which the compressed structure undergoes one or more compression cycles effective to form a composite structure in which the ceramic nanoparticles are substantially uniformly dispersed within the metal substrate material.

In another aspect, composite structures are provided that include nanoparticle reinforcement. In one embodiment, the composite structure includes a substrate that includes a relatively soft material, and nanoparticles that include a relatively hard material and which are embedded (i) within at least a surface region of the substrate, or (ii) uniformly within and throughout the substrate, in an amount effective to improve the wear resistance of the substrate.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale.

DETAILED DESCRIPTION

Methods have been developed for producing nanoparticle-reinforced composite material to provide improved wear resistance and surface hardness. The composite materials include a nanoparticle region that includes a base substrate material in which nanoparticles are embedded. These nanoparticle-reinforced composites have greater wear resistant and surface hardness as compared to the base substrate by itself (i.e., without embedded nanoparticles). The nanoparticles may be substantially uniformly embedded within the substrate and also possess improved ductility and dimensional stability compared to composites reinforced with micro-sized particles.

As compared to conventional microparticle-reinforced composites, the present nanoparticle-reinforced composites may have improved mechanical characteristics. Without being bound to any particular theory, it is believed that this improvement may be due at least in part to the nanoparticle reinforcement having better wettability, less settling, and more homogeneous dispersion in the base/matrix material as compared to microparticle reinforcements. Conventional heat treatments of the composite are believed to be ineffective to overcome the poor wettability, settling, and inhomogenous dispersion of such microparticle reinforced composites.

The present methods for forming the present nanoparticle-reinforced composites generally include a hot-rolling technique, a roll-bonding technique, or both, that forms the nanoparticle-reinforced composites described herein. These techniques advantageously combine a hot-rolling process, a roll-bonding process, or both, with the nanocomposite concept, so to avoid one or more of the problems and limitations described above and widen the fields of application for the substrate materials.

Nanoparticle-Reinforced Composites

Generally the nanoparticle-reinforced composites include a substrate, which is the base or matrix material, and a plurality of nanoparticles embedded within at least a portion of the matrix material. In some embodiments, the plurality of nanoparticles is embedded within an exterior surface region of the matrix material, providing a nanoparticle surface layer to the material. This nanoparticle surface layer is an exterior surface region of the nanoparticle-reinforced composite.

Figure 1:
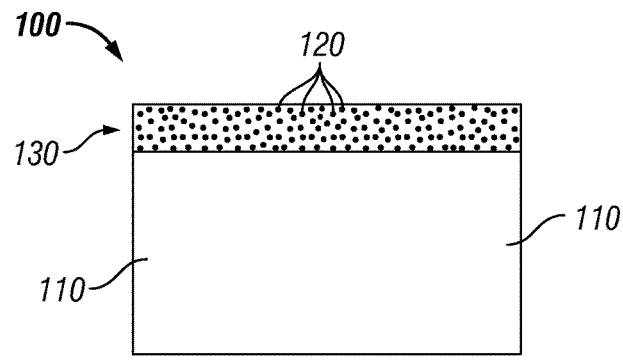
FIG. 1 is cross-sectional view of a nanoparticle-reinforced composite according to one embodiment of the present disclosure.

One embodiment of a nanoparticle-reinforced composite is shown in FIG. 1. The composite 100 includes a substrate 110 and nanoparticles 120 that are embedded within a surface region 130 of the substrate 110. The embedded nanoparticles 120 may be present in the substrate 110 at a volume fraction from about 5.0 vol. % to about 20 vol. % in the surface region 130 of the composite 100.

In embodiments, the thickness of the surface region 130 will be determined at least in part by the amount of compressive pressure applied to the composite 100 during its manufacturing.

In some embodiments, the nanoparticles are substantially uniformly embedded within the substrate. As used herein, "substantially uniformly embedded" refers to the nanoparticles being substantially evenly distributed throughout a material. In one embodiment, the nanoparticles are uniformly embedded within the substrate.

Figure 2:
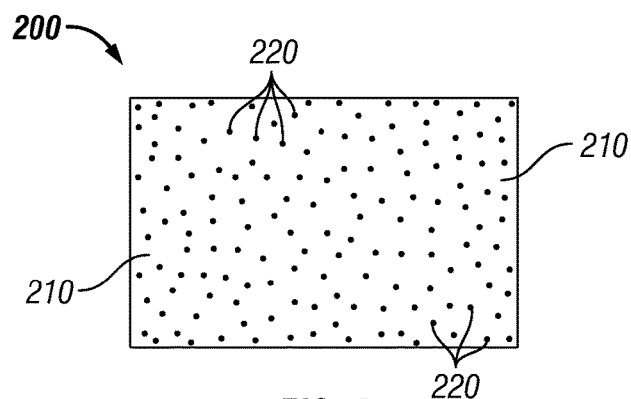
FIG. 2 is cross-sectional view of a nanoparticle-reinforced composite according to another embodiment of the present disclosure.

Another embodiment of nanoparticle-reinforced composite is shown in FIG. 2. The composite 200 includes a substrate 210 and nanoparticles 220 that are substantially uniformly embedded within the substrate 210. The embedded nanoparticles 220 may be present in the substrate 210 at a volume fraction from about 5.0 vol. % to about 20 vol. % of the composite 200.

In any of the foregoing illustrated embodiments, the nanoparticles are present within the substrate in an amount that is effective to improve the wear resistance of the substrate, and consequently, the resulting nanoparticle-reinforced composite.

In embodiments, the substrate comprises a relatively soft material. As used herein, a "relatively soft material" is a material having a Brinell hardness up to about 4,000 MPa. In one embodiment, the relatively soft material has a Brinell hardness from about 150 MPa to about 3,000 MPa. In another embodiment, the relatively soft material has a Brinell hardness from about 40 MPa to about 2,800 MPa. In yet another embodiment, the relatively soft material has a Brinell hardness from about 150 mPa to about 600 MPa.

In a preferred embodiment, the substrate is a metal. Non-limiting examples of suitable metals include aluminum, magnesium, titanium, alloys thereof, and the like. Pure aluminum is a relatively soft material with a tensile strength range of about 20 MPa to about 90 MPa (depending on the purity) and a bulk modulus of about 76 GPa. In other embodiments, the substrate is a polymer.

In embodiments, the nanoparticles comprise a relatively hard material. As used herein, a "relatively hard material" is a material having a Brinell hardness that is greater than about 10,000 MPa. In one embodiment, the relatively hard material has a Brinell hardness from about 10,000 MPa to about 30,000 MPa. In another embodiment, the relatively hard material has a Brinell hardness from about 15,000 to 25,000 MPa.

In some embodiments, the nanoparticles are ceramic nanoparticles. Non-limiting examples of suitable ceramic nanoparticles include aluminum oxide ($Al_2O_3$), silicon carbide (SiC), and the like. Ceramic SiC nanoparticles are a relatively hard material with a tensile strength of about 230 MPa and a bulk modulus of about 220 GPa. In other embodiments, the nanoparticles are diamond nanoparticles.

In one embodiment, the nanoparticles have an average particle size that is less than 1 micron in their longest dimension. In another embodiment, the nanoparticles have an average particle size from about 20 nm to 950 nm in their longest dimension. In yet another embodiment, the nanoparticles have an average particle size from about 50 nm to about 200 nm in their longest dimension.

Methods of Manufacture

The present methods described herein advantageously provide a surface enhancement of a substrate, such as a metal substrate, that allows for the coexistence of a hard wearable surface and a ductile substrate without introducing an interface between them.

Compared to conventional surface treatment/coating techniques, such as physical vapor deposition (PVD), chemical vapor deposition (CVD), ion implantation, thermal spray, or laser cladding, the methods as described herein also have several advantages which allow the methods to be employed in a wide variety of applications. For example, some of these advantages include applicability to non-flat surfaces, thus providing high formability; the ability to easily apply nanoparticles to selected areas and/or locations without affecting the rest of the substrate surface; and being carried out at relatively low cost, which provides significant potential for mass production.

Hot-Rolling Process

The hot-rolling process as described herein facilitates the formation of a nanocomposite surface layer on substrate materials in order to improve their surface properties, such as wear resistance. During the hot-rolling process, the recrystallization-induced yield strength and hardness reduction allow a considerable concentration of nanoparticles to embed within a portion of the matrix material of the substrate.

Compared to conventional surface treatment/coating techniques, the hot-rolling process is efficient and capable of generating a large-scale nanoparticle surface layer with a dense and void-free composite layer. Furthermore, this process allows for a strong bonding to be formed seamlessly between the nanoparticle surface layer and the substrate due to the inherent material continuity between the layer and substrate, thereby eliminating debonding problems inherent in other surface coating techniques.

The present hot-rolling techniques do not form a coating interface between the nanocomposite surface layer and the substrate, unlike other conventional techniques. Instead, the hot-rolling techniques beneficially adapt the surface of the substrate, via embedding nanoparticles within the substrate to form a nanocomposite surface layer therein, strengthen its wear resistance, as the interfaces inside the nanoparticle-reinforced composite are enhanced by the substrate nucleating upon the nanoparticles. As a result, the present hot-rolling methods improve the surface properties of the substrate with the incorporation of the nanoparticle surface layer. This enables one to use substrate materials of construction in applications where the substrate material would otherwise be unsuitable due to its poor surface properties.

Generally, the methods for forming the nanoparticle-reinforced composites via a hot-rolling process include hot-rolling at least one surface of a substrate material. In certain embodiments, only one surface of the substrate material is hot-rolled (reinforced), and in other embodiments, more than one surface of the substrate material is hot-rolled.

In some embodiments, the substrate material is a metal. Suitable metal substrates include aluminum, magnesium, titanium, and alloys thereof. Other metals that suffer from poor surface properties may also be suitable substrate materials.

In some embodiments, the substrate material is a plastic. In some embodiments, the nanoparticles are ceramic nanoparticles. Non-limiting examples of suitable ceramic nanoparticles include aluminum oxide ($Al_2O_3$), silicon carbide (SiC), and the like. In other embodiments, the nanoparticles are diamond nanoparticles.

Figure 3:
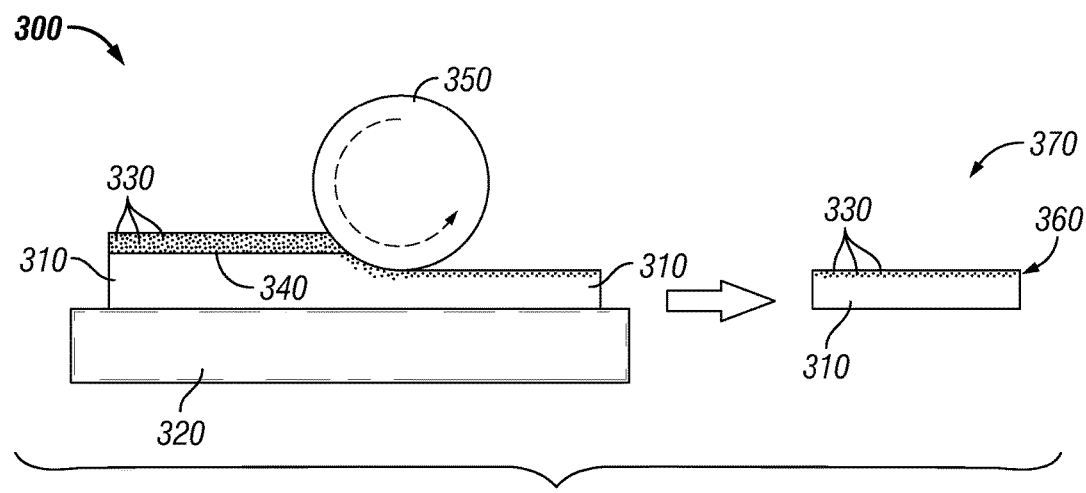
FIG. 3 is a schematic illustration of a hot-rolling method for fabricating a nanoparticle-reinforced composite according to one embodiment of the present disclosure.

In one embodiment, as schematically illustrated in FIG. 3, a hot-rolling method 300 includes heating a substrate material 310, e.g., via a commercial industrial hot plate 320, disposing nanoparticles 330 onto a surface 340 of the heated substrate 310, and applying a roller 350 across the surface 340 of the heated substrate 310 under a pressure to embed the nanoparticles 330 into the softened heated substrate 310 in a solid-state process to form a nanoparticle-reinforced composite 370. The pressure applied by the roller 350 creates material flow in the substrate 310, thereby enabling the nanoparticles 330 to experience full contact and indentation within the substrate 310. Using predetermined spin speed and pressure, the hot-rolling technique 300 allows the entire surface 340 of the substrate 310 to be processed efficiently.

Similar to the nanoparticle-reinforced composite 100 illustrated in FIG. 1, the resulting nanoparticle-reinforced composite 370 has the nanoparticles 330 embedded within the surface region 360 of the substrate 310.

In some embodiments, the substrate material is heated to a temperature that is greater than the recrystallization temperature of the substrate material. For example, in embodiments where the substrate material is aluminum, the substrate material may be heated to a temperature of about 250° C. or greater.

In some embodiments, the step of disposing the nanoparticles includes dispersing the nanoparticles in a non-solvent liquid to form a suspension and then spraying the suspension onto the surface of the heated substrate. Examples of suitable non-solvent liquids include water, aqueous solutions, and volatile organic liquids. In certain embodiments, the non-solvent liquid is selected for its relatively low boiling point and will evaporate upon contact with the heated substrate, leaving the nanoparticles dispersed uniformly across the surface of the substrate.

In embodiments in which the substrate is aluminum and the nanoparticles are SiC, the passivation oxide layers on the surfaces of both the aluminum substrate and the SiC nanoparticles may not play a part in the hot-rolling process due to their thickness of several nanometers.

During material preparation, in order to achieve a certain volume fraction for the nanoparticles in the composite, the thickness, e.g., as determined by the compressive pressure of the roller, and the volume of the substrate are predetermined, e.g., set to certain values. The volume fraction of the nanoparticles in the composite can therefore be directly calculated. In some embodiments, the nanoparticle volume fraction is from about 5.0 vol. % to about 20 vol. % in the surface region of the composite.

During the hot-rolling process, the high temperature can lead to a sharp decrease in the strength and hardness of the substrate. For example, pure aluminum, at the hot-rolling temperature of 250° C. to 350° C., loses approximately 40.0% of the strength and hardness it exhibits at room temperature. The ceramic nanoparticles such as SiC, however, possess high temperature stability (up to 800° C. in air), and the mechanical properties can therefore remain relatively constant. Nanoparticles with a particle size of about 50 nm to about 200 nm may be suitable.

Figure 4:
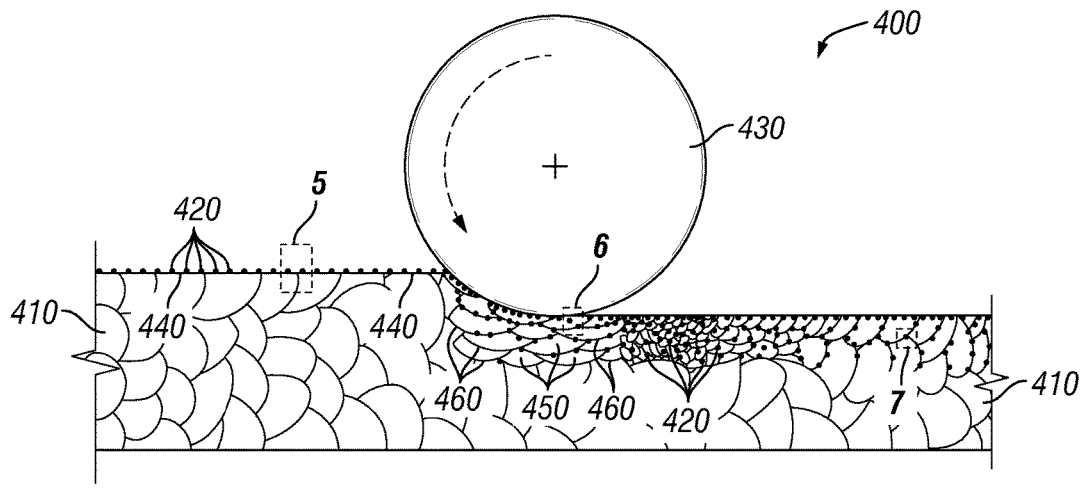
FIG. 4 is an illustration of an exemplary hot-rolling method during fabrication of a nanoparticle-reinforced composite according to one embodiment of the present disclosure. It depicts the microstructure changes that occur at different stages of the hot-rolling process.
Figure 5:
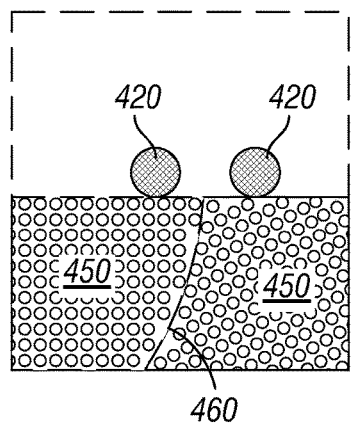
FIG. 5 is a magnified illustration of a portion of the substrate and the nanoparticles prior to being embedded within the substrate using the hot-rolling method in FIG. 4.
Figure 6:
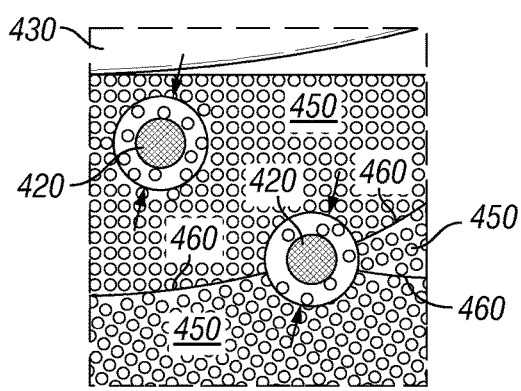
FIG. 6 is a magnified illustration of a portion of the substrate and the nanoparticles embedded therein prior to recrystallization using the hot-rolling method in FIG. 4.
Figure 7:
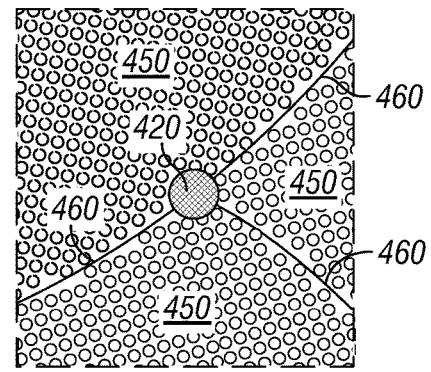
FIG. 7 is a magnified illustration of a portion of the substrate embedded with the nanoparticles after recrystallization using the hot-rolling method in FIG. 4.

Another exemplary hot-rolling process is illustrated in FIG. 4, which depicts the microstructure changes that occur at different stages of the hot-rolling process 400. FIG. 5 is a magnified illustration of the nanoparticles 420 and a metal substrate 410 prior to compression via the roller 430. Under the compression of the roller 430, the nanoparticles 420 can cause very high stress concentration upon the substrate 410 and break the metal substrate surface 440 as they are pressed into both the grains 450 and grain boundary areas 460 inside the metal substrate 410. This mechanical process 400 results in amorphous regions with many defects around the nanoparticles 420, indicated by circles and arrows as shown in FIG. 6. The grains 450 in the metal substrate 410 (shown in FIG. 4) that have sustained large deformation undergo recrystallization, a procedure of nucleation and grain growth, to release the defects and decrease system energy. The recrystallization process is shown in FIG. 4. The impurities present within the metal substrate 410 allow the nanoparticles 420 to function as nucleating sites and act as a dispersion strengthening agent and restrict the migration of dislocations. This close connection between the surfaces of the nanoparticles 420 and the metal substrate 410, as shown in FIG. 7, creates a strong interface in the resulting nanoparticle-reinforced composites. As a result, these nanoparticles-reinforced composites have improved hardness.

Roll-Bonding Process

The roll-bonding process as described herein facilitates the formation of nanoparticle reinforced composites having improved surface properties, such as wear resistance, and strength, such as tensile strength.

Generally, the roll-bonding process includes compressing a structure one or more times between rollers to substantially uniformly disperse nanoparticles within the substrate material of the structure. In embodiments, the structure is compressed at room temperature, which beneficially maintains the strength and hardness of the substrate material that would otherwise decrease at high temperatures.

In certain embodiments, with each compression, the thickness of the structure decreases. For example, this may be achieved by decreasing the distance between the compression rollers.

Prior to compression, the starting structure includes a stack of two or more layers of substrate material and nanoparticles disposed between adjacent layers of the substrate material. The bonding strength between the nanoparticles and the substrate material of the resulting composite structure depends at least in part on the force pressure provided by the rollers, rolling speed, and friction coefficient, and the amount of oxidation, prior to compression, on the surface of each layer of the two or more layers of the substrate material.

Without being bound to any particular theory, embedding nano-sized particles, as opposed to larger sized particles, may allow for the ability to form a substantially uniform composite structure in fewer compressions. This decrease in the number of compressions may be advantageous for the mechanical properties of the resulting structures, which benefits the development of robust nanoparticle-reinforced composites, and may also provide a cost benefit for their manufacture.

Figure 8:
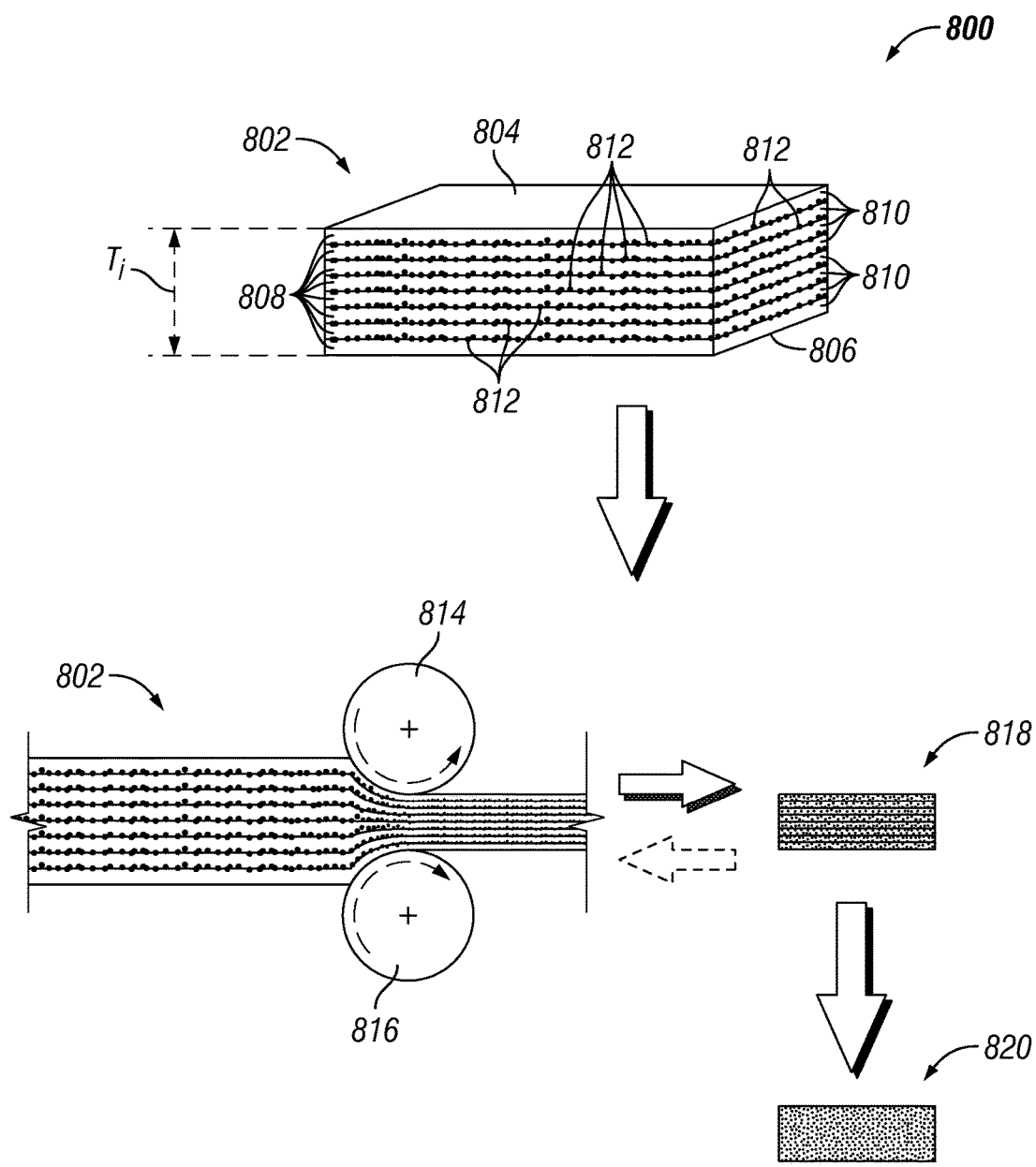
FIG. 8 is a schematic illustration of a roll-bonding method for fabricating a nanoparticle-reinforced composite according to one embodiment of the present disclosure.

In one embodiment, as schematically illustrated in FIG. 8, a roll-bonding method 800 includes providing a starting structure 802 having two opposing outer surfaces 804, 806 and an initial thickness ($T_i$) that extends therebetween. The starting structure 802 includes a stack of two or more layers 808 of a substrate material 810 and a plurality of nanoparticles 812 dispersed between adjacent layers of the substrate material 810.

The roll-bonding method 800 further includes compressing the starting structure 802 between rollers 814, 816 that, in combination, apply pressure to the two opposing outer surfaces 804, 806 of the starting structure 802 to embed the plurality of nanoparticles 812 within the layers of the substrate material 810 and bond the layers together, forming a compressed structure 818. The compressed structure 818 undergoes one or more compression cycles, indicated by the dotted arrow, effective to form a composite structure 820 in which the nanoparticles 812 are substantially uniformly dispersed within the substrate material 810.

In some embodiments, the starting structure, prior to the roll-bonding process, undergoes a hot-rolling process as described above. In one embodiment, at least one of the layers in the stack of two or more layers of a substrate material in the starting structure have an additional plurality of ceramic nanoparticles embedded within a surface region of the substrate, produced in a hot-rolling process.

In certain embodiments, the structure, between compressions, is cut into two or more layers, and then the layers are stacked to be recompressed. In one embodiment, cutting, stacking and compressing are repeated two or more times. In some embodiments, a second plurality of ceramic nanoparticles is disposed between adjacent layers during at least one stacking of the cut layers.

In certain embodiments, the structure, between compressions, is cut into two or more layers, annealed, and then the layers are stacked to be recompressed. In one embodiment, the stacked layers are vertically aligned, whereas in another embodiment, the stacked layers are offset.

Figure 9:
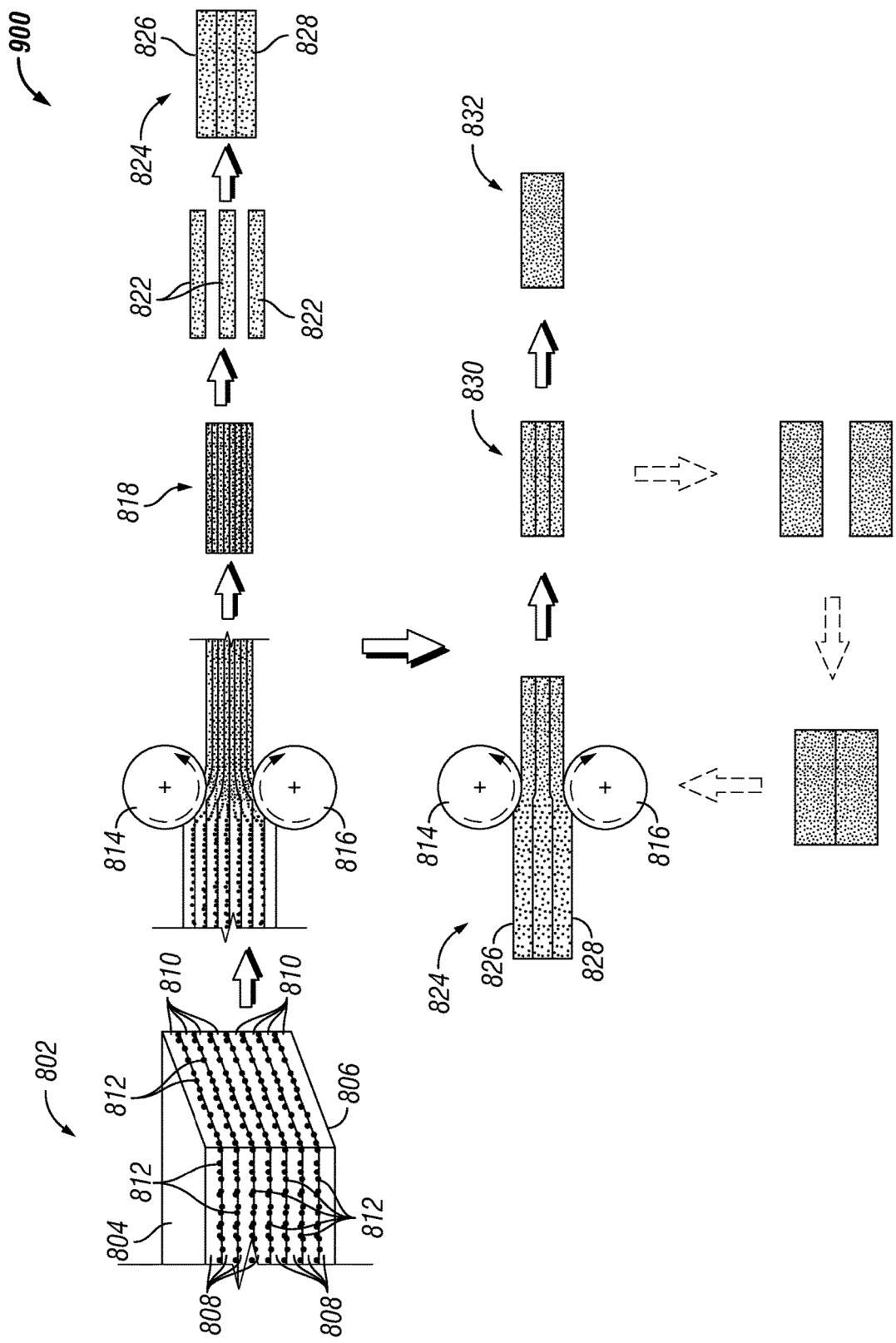
FIG. 9 is a schematic illustration of a roll-bonding method for fabricating a nanoparticle-reinforced composite according to another embodiment of the present disclosure.

FIG. 9 illustrates a possible variation of the roll-bonding method 800 shown in FIG. 8. The roll-bonding method 900 includes providing the starting structure 802 and compressing the starting structure 802 between rollers 814, 816 to form the first compressed structure 818 as described above.

The roll-bonding method 900 further includes (i) cutting the first compressed structure 818 into two or more layers 822; (ii) annealing the two or more layers 822; (iii) stacking the annealed two or more layers 822 to form an intermediate structure 824 having two opposing outer surfaces 826, 828; and (iv) compressing the intermediate stacked structure 824 between rollers 814, 816 that, in combination, apply pressure to the two opposing outer surfaces 826, 828 of the intermediate structure 824 to bond the annealed two or more layers 822 together to form a bonded intermediate structure 830. In one embodiment, the bonded intermediate structure 830 is the final composite structure 832 in which the nanoparticles 812 are substantially uniformly dispersed within the substrate material 810. In another embodiment, the bonded intermediate structure 830 may undergo two or more cycles of cutting, annealing, stacking, and compressing, as indicated by the dotted arrows, to form the final composite structure 832.

In some embodiments, the structure, after the first compression, is cut into two or more layers, annealed, and then the two or more layers are stacked with additional nanoparticles disposed between each adjacent pair of the stacked layers, and the stacked layers are then compressed. In such embodiments, the structure, between subsequent compressions, may also be cut into one or more layers, annealed, and then stacked to be recompressed. In one embodiment, the stacked layers are vertically aligned, whereas in another embodiment, the stacked layers are laterally offset in one or more directions.

Figure 10:
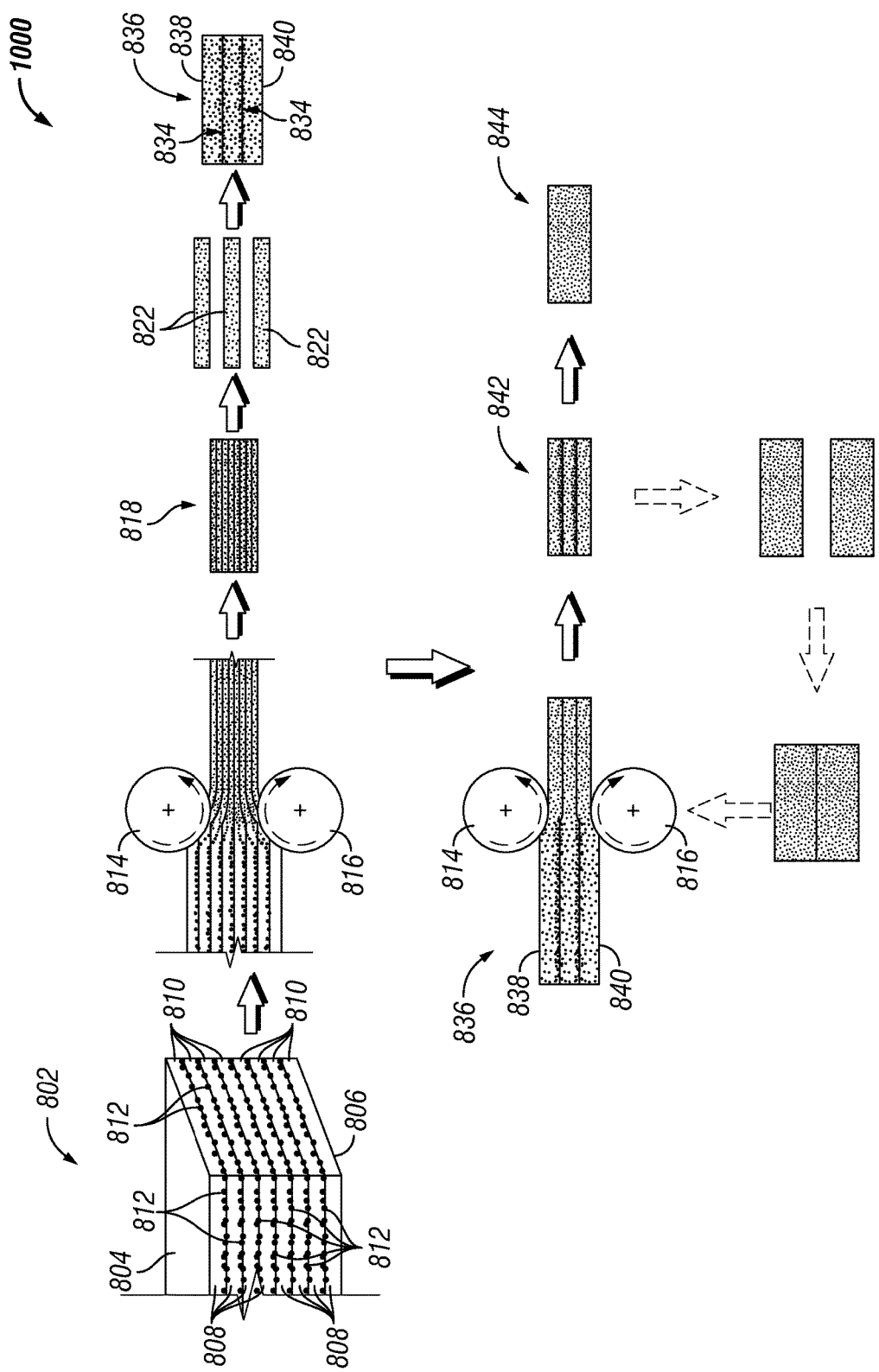
FIG. 10 is a schematic illustration of a roll-bonding method for fabricating a nanoparticle-reinforced composite according to yet another embodiment of the present disclosure.

FIG. 10 illustrates another possible variation of the roll-bonding process 800 shown in FIG. 8. The roll-bonding method 1000 includes providing the starting structure 802 and compressing the starting structure 802 between rollers 814, 816 to form the first compressed structure 818 as described above.

The roll-bonding method 1000 further includes (i) cutting the first compressed structure 818 into two or more layers 822; (ii) annealing the two or more layers 822; (iii) stacking the annealed two or more layers 822; (iv) disposing an additional plurality of nanoparticles 834 between adjacent layers of the stacked two or more layers 822 to form an intermediate stacked structure 836 having two opposing outer surfaces 838, 840; and (v) compressing the intermediate stacked structure 836 between rollers 814, 816 that, in combination, apply pressure to the two opposing outer surfaces 838, 840 of the intermediate stacked structure 836 to embed the additional plurality of nanoparticles 834 within the two or more layers 822 to form another intermediate structure 842. In one embodiment, the another intermediate structure 842 is the final composite structure 844 in which the nanoparticles 812, 834 are substantially uniformly dispersed within the substrate material 810. In another embodiment, the another intermediate structure 832 may undergo two or more cycles of cutting, annealing, stacking, and compressing, as indicated by the dotted arrows, to form the final composite structure 844.

In one embodiment, during the stacking of the two or more layers, the second plurality of nanoparticles is disposed between the adjacent layers.

In some embodiments, the step of disposing the second plurality of nanoparticles includes dispersing the nanoparticles in solvent, such as acetone, to form a suspension and then spraying the suspension between adjacent layers of the stacked two or more layers.

In some embodiments, the composite structure has a thickness that is up to about 80% of the initial thickness of the starting structure. In one embodiment, the thickness of the composite structure is from about 60% to about 80% of the initial thickness.

During material preparation, in order to achieve a certain volume fraction for the nanoparticles in the composite, the thickness, e.g., as determined by the compressive pressure of the rollers, and the volume of the substrate are predetermined, e.g., set to certain values. The volume fraction of the nanoparticles in the composite can therefore be directly calculated. In some embodiments, the nanoparticle volume fraction is from about 5.0 vol. % to about 20 vol. % of the composite structure.

In some embodiments, the substrate material is a relatively soft material. In one embodiment, the substrate material is a metal. Suitable metals may include aluminum, magnesium, titanium, alloys thereof. Other metals that suffer from poor surface properties may also be suitable matrix materials. In another embodiment, the substrate material is plastic.

In some embodiments, the first plurality of nanoparticles, the second plurality of nanoparticles, or both comprise a relatively hard material. In certain embodiments, the first plurality of nanoparticles, the second plurality of nanoparticles, or both comprise ceramic nanoparticles. Non-limiting examples of suitable ceramic nanoparticles include aluminum oxide ($Al_2O_3$), silicon carbide (SiC), and the like.

In some embodiments, the first plurality of nanoparticles, the second plurality of nanoparticles, or both comprise diamond nanoparticles.

In one embodiment, the nanoparticles have an average particle size that is less than 1 micron in their longest dimension. In another embodiment, the nanoparticles have an average particle size from about 20 nm to 950 nm in their longest dimension. In yet another embodiment, the nanoparticles have an average particle size from about 50 nm to about 200 nm in their longest dimension.

While the present invention may be embodied in many different forms, disclosed herein are specific illustrative embodiments thereof that exemplify the principles of the invention. It should be emphasized that the present invention is not limited to the specific embodiments illustrated.

I claim:

1. A method for forming a composite structure, the method comprising:
   heating a metal substrate material to a selected temperature to form a heated metal substrate;
   disposing a plurality of ceramic nanoparticles onto a surface of the heated metal substrate, wherein the ceramic nanoparticles have an average particle size of from 20 nm to 950 nm, wherein the plurality of ceramic nanoparticles are dispersed in a non-solvent liquid when disposing the plurality of ceramic nanoparticles on the heated substrate, wherein the non-solvent liquid evaporates upon contact with the heated substrate; and
   applying a roller across the surface of the heated metal substrate under a pressure effective to embed the ceramic nanoparticles within a surface region of the heated metal substrate.

2. The method of claim 1, wherein the metal substrate material has a Brinell hardness between 40 MPa and 4,000 MPa and the ceramic nanoparticles have a Brinell hardness greater than 10,000 MPa.

3. The method of claim 1, wherein the metal substrate material has a recrystallization temperature that is lower than the selected temperature.

4. The method of claim 1, wherein the disposing comprises spraying a suspension of the nanoparticles dispersed in a liquid vehicle onto the surface of the heated metal substrate.

5. The method of claim 1, wherein the metal substrate material comprises aluminum, magnesium, titanium, or an alloy thereof.

6. The method of claim 1, wherein the ceramic nanoparticles have an average longest dimension from 50 nm to 200 nm.

7. The method of claim 1, wherein the ceramic nanoparticles comprises aluminum oxide, silicon carbide, or a combination thereof.

* * * * *